INVENTOR.
DONALD L. FREESE
BY
Don Finkelstein
ATTORNEY

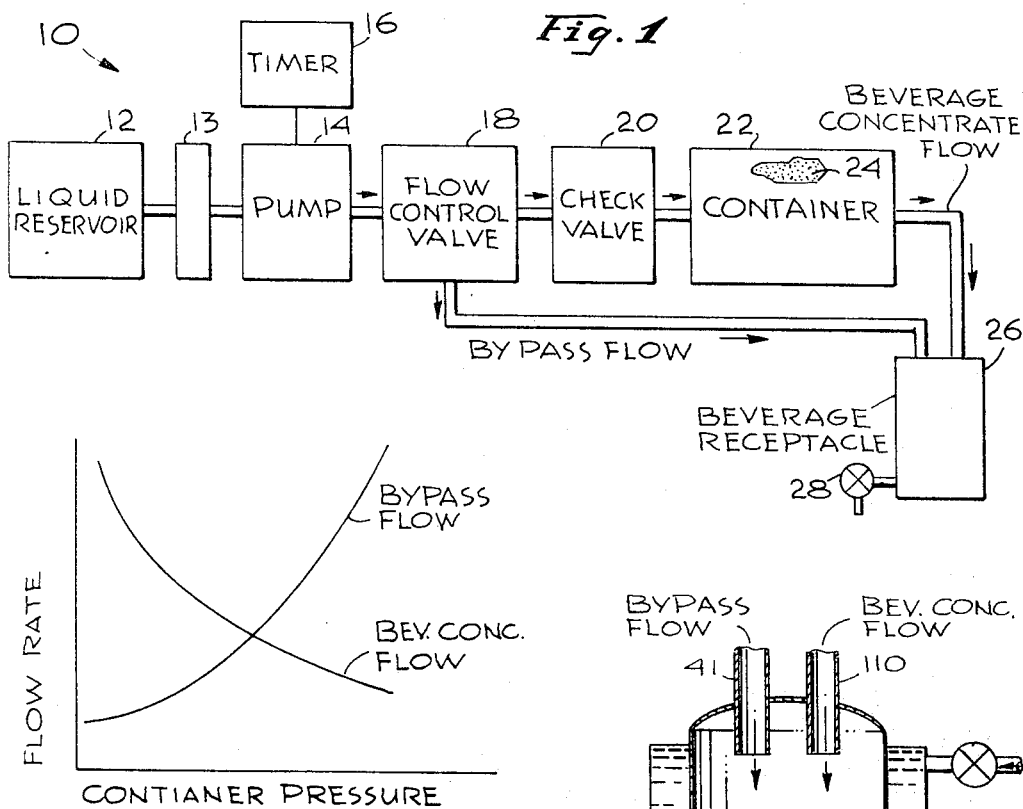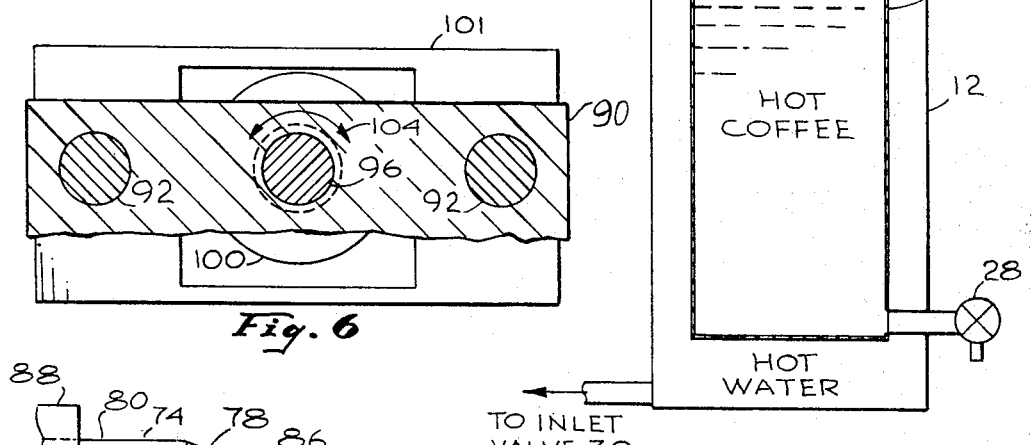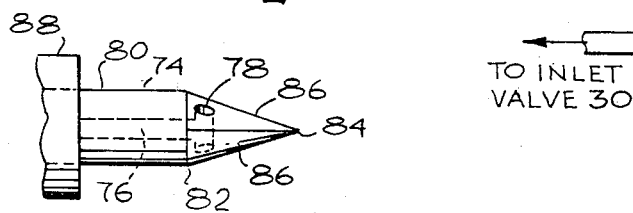

United States Patent Office 3,408,921
Patented Nov. 5, 1968

3,408,921
BEVERAGE MAKING ARRANGEMENT
Donald L. Freese, 813 S. Cyprus,
Santa Ana, Calif. 92701
Filed Feb. 14, 1966, Ser. No. 527,127
10 Claims. (Cl. 99—295)

ABSTRACT OF THE DISCLOSURE

There is described herein an improved beverage making and dispensing arrangement in which the flow of water through a flow control valve and a check valve into a water reactive product, such as coffee, is carefully controlled in response to the characteristics of the water reactive product being made. The flow through the water reactive product which may be utilized in applicant's invention herein in its original container by insertion thereof in applicant's beverage making arrangement is varied in response to the actual pressure existing in the container and consequently applicant provides a bypass flow as well as the flow of water into the container so that as the pressure in the container builds up, for example in brewing coffee, the flow of water to the container is decreased and the bypass flow increased since the greater extraction of the beverage is obtained at higher pressures. The bypass flow and the concentrate flow from the container is then mixed to provide a consistent beverage.

---

This invention relates to the beverage making art and more particularly to an improved beverage making arrangement for supplying predetermined amounts of liquid to a liquid reactive food product to provide a potable beverage.

Increased utilization of various processed, dehydrated and/or concentrated liquid reactive food products, commercially available in sealed containers, for long-term shelf life protection, has required development of techniques for mixing properly the correct amounts of liquid with the liquid reactive food products to provide a consistent potable food therefrom in a sanitary manner. Liquid reactive food products that are generally commercially available in vacuum or pressure packed sealed containers may be either totally or partially soluble in the liquid. Readily available freshly ground, roasted coffee and tea are examples of such liquid reactive food products not totally soluble in the liquid. Examples of liquid reactive food products that are totally soluble include instant coffee, instant tea, chocolate drink products, dehydrated soups, and the like.

Where commercial establishments are dispensing, for example, such beverages made or derived from a liquid reactive food product, it is desirable to provide a structure that, with a minimum amount of labor and minimum amount of attendance, operates in a highly sanitary manner and not only provides a predetermined amount of beverage from a given amount of liquid reactive food product, but also provides a beverage having consistent, delectable qualities. Further, since many beverages so made cannot withstand even comparatively short-term storage, such as for a few hours, without losing their initial high quality and delectable taste, it is desirable that the structure for providing such beverages be able to make rapidly sufficient quantities of the beverage consistent with the rate of utilization or dispensing by the establishment.

Mobile catering trucks, such as the familiar lunch wagons, are one example of a commercial establishment that must provide a delectable beverage that is preferably consistent day-to-day and from stop-to-stop that such mobile catering vehicles may make. For example, coffee dispensed by such catering vehicles is, at present, often actually made sometimes between five and eight hours before it is dispensed to customers. Such long-term storage has an adverse effect on the taste and quality of the coffee thus dispensed. While structures for making hot coffee, rapidly have heretofore been known, to the best of applicant's knowledge, none of them has achieved commercial acceptance since the quality of coffee provided and the taste thereof were not acceptable to either the proprietor of such mobile catering vehicles or the customers thereof.

Accordingly, it is an object of applicant's invention herein to provide an improved beverage-making structure.

It is another object of applicant's invention herein to provide a beverage-making structure that provides a consistent quality of beverage.

It is yet another object of applicant's invention to provide a beverage-making structure that has the capacity for manufacturing under sanitary conditions potable beverages at a rate commensurate with the rate of commercial utilization.

For convenience applicant describes his invention of an improved beverage-making structure as embodied in a structure for providing the rapid making of hot coffee from freshly ground coffee in sealed containers. Applicant has chosen this arrangement for an example since such an arrangement incorporates utilization of a liquid reactive food product that is not completely soluble in the liquid and which, applicant has found, is comparatively sensitive to variations in the manufacturing process and hot coffee does not have the capacity for storage without losing much of the original quality and taste.

In this embodiment of applicant's invention, there is provided a pump that is controlled by a timer. The pump is connected to a liquid reservoir comprising a source of hot water and is adapted to draw hot water from the source and raise the pressure thereof to discharge a second or pump preselected flow rate of hot water for a time period as determined by the setting of the timer.

The water discharged from the pump flows through a flow control valve that divides the water into two discharge paths. In the first discharge path, a first or container flow of liquid is directed to flow into a check-valve structure and from the check-valve structure into the liquid reactive food product container and a beverage concentrate flows from the container to a beverage receptacle.

In this example of applicant's invention, the liquid reactive food product is freshly ground coffee and the container is a commercially available sealed can of such ground coffee.

The flow control valve also by passes a predetermined amount of hot water from the pump to provide a bypass flow which mixes with the beverage concentrate flow in the beverage receptacle to provide the beverage.

Applicant has found that the quality and taste of coffee made in such a structure depends upon the duration of the flow of the hot water through the container, the flow rate and the pressure of the hot water while it is wetting the coffee grounds. Further, applicant has found that the pressure in the container can vary appreciably due to such factors as variations in the expansion rate of food particles in the container and chemical reactions between the food products and the liquid.

In order to achieve a consistent quality and delectable taste in the beverage produced, the flow control valve in applicant's improved beverage making arrangement automatically provides variations in the bypass flow rate and the flow rate through the container in response to the pressure actually existing in the container.

Further, since applicant provides a pump arrangement for providing liquid under pressure to the container, the efficiency, which term may be defined as meaning the extraction of the desirable qualities in the food product in the container and not extracting the undesirable qualities, and/or speed with which beverage is made is considerably increased over that provided by conventional gravity feed types of coffee making arrangements. Applicant has found that as the pressure increases in the container, the extraction efficiency increases and requires that more liquid be directed into the bypass flow and consequently less in the container flow so as to extract only the desirable qualities of the food products, rather than over extract. Thus, the mixing of the beverage concentrate flow and the bypass flow in the beverage receptacle provides a predetermined amount of beverage in a given time period consistent in taste and quality independently of pressure variations occurring in the container of coffee. The timer automatically stops the brewing cycle at the end of the selected time period, after which the spent container and product are removed and disposed of in a unitary compact unit, thus affording maximum sanitation because each container is a fresh brewing chamber.

In order to obtain the efficiency associated with utilization of applicant's improved beverage making structure, applicant provides, as part of the supply means for supplying liquid to the container, a plurality of piercing members that are adapted to pierce and extend into a first end of the sealed container. The piercing members have flow passages therein to allow the container flow of hot water to spray therefrom into the interior of the container to wet and pass through the food products contained therein. Similarly, the extraction means provided by applicant comprises a plurality of piercing members similar to the piercing members on the supply means that are adapted to receive the beveraage concentrate made in the container and transmit same to a beverage receptacle.

This and other embodiments of applicant's invention may be more fully understood from the following detailed description taken together with the accompanying drawings wherein similar reference characters refer to similar elements throughout and in which:

FIG. 1 is a schematic diagram of one embodiment of applicant's invention;

FIG. 2 is a graph illustrating variations in flow rate with pressure of a hot coffee making embodiment of applicant's invention; and FIGS. 3, 4, 5 and 6 illustrate structure in an embodiment of applicant's invention.

Figure 3:
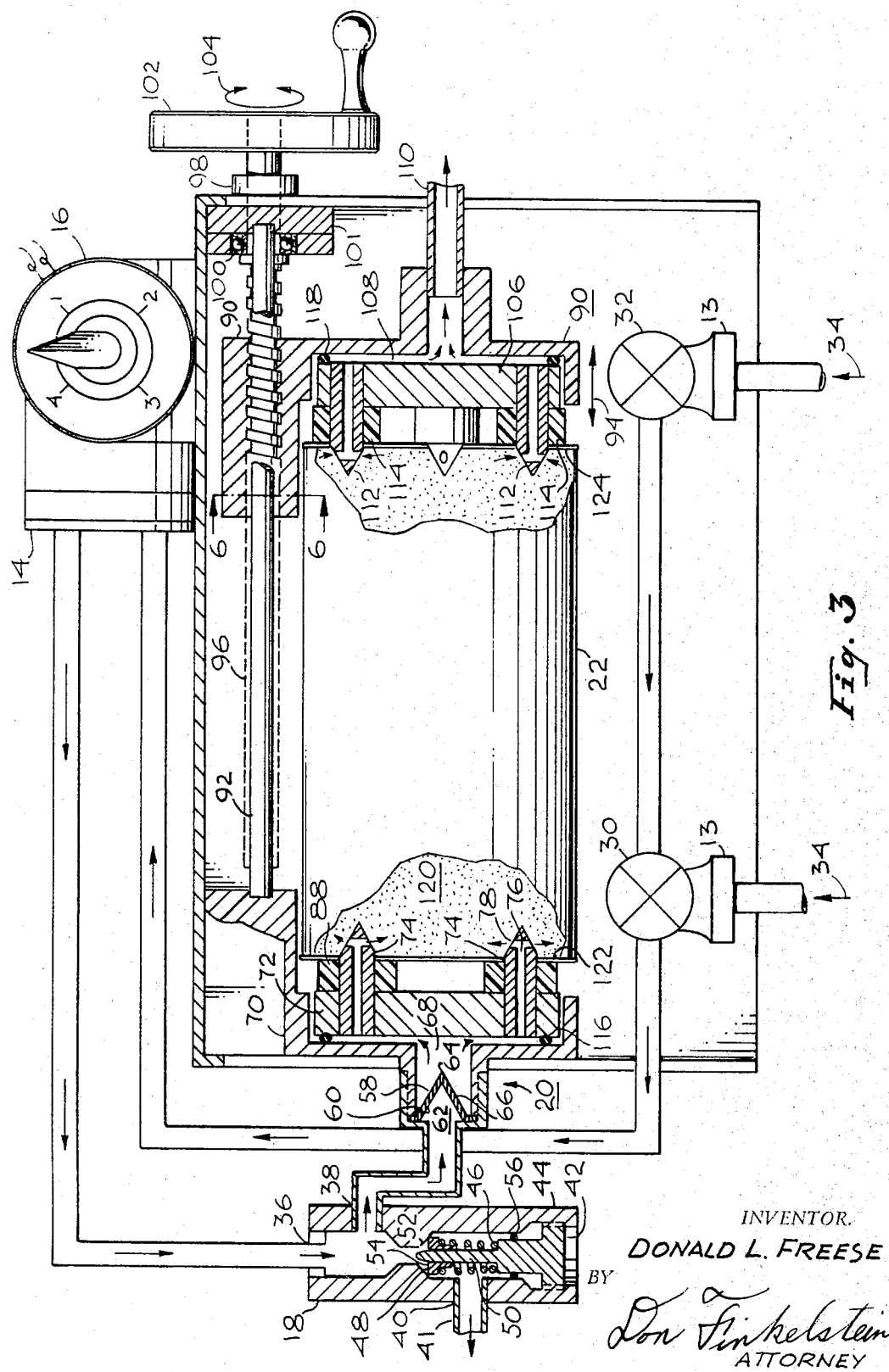

Before detailing applicant's description of the preferred embodiment of his invention, applicant wishes to point out that the invention is described as utilized in the structure for providing an arrangement to make hot coffee. As noted above, applicant has selected this particular utilization of his invention for purposes of illustration in order that the features thereof may be more fully disclosed. However, such selection of this utilization of applicant's invention is for illustrative purposes in the description of the improved beverage making arrangement and is not to be construed as limiting applicant's invention.

Referring now to FIGURE 1, there is shown a schematic diagram of the structure associated with one embodiment of applicant's invention of an improved beverage making arrangement, generally designated 10. A liquid reservoir 12, in this embodiment of applicant's invention, contains a supply of hot water as the liquid contained therein. The hot water from the liquid reservoir 12 is supplied through filter 13 to a pump means 14 controlled by a timer 16. That is, in this embodiment of applicant's invention, the timer 16 is set for a predetermined length of time depending upon the length of time that it is desired to have the pump 14 activated during the making of a beverage.

The pump 14 raises the pressure of the hot water received from liquid reservoir 12 and provides a pump discharge or second fluid flow rate of hot water under pressure to the inlet port of flow control valve 18. Flow control valve 18 is provided with a container discharge port that discharges the first or container flow rate of hot water into a check valve means 20 and this container flow of hot water flows from the check valve 20 into the previously sealed container 22 containing liquid reactive food product 24 therein which, in this embodiment of applicant's invention, comprises freshly roasted coffee grounds. The container 22 may be, for example, a conventional either pressure or vacuum sealed can of coffee. The preferred arrangement for introducing the container flow into the container is described below in greater detail.

The flow control valve also has a bypass port to provide a bypass flow rate of hot water that is directed to a beverage receptacle 26.

An extraction means, as described below in greater detail, is provided to extract a beverage concentrate flow from the container 22 and direct it to the beverage receptacle 26 where it mixes with the bypass flow in the beverage receptacle 26 to provide, in this embodiment of applicant's invention, hot coffee. Hot coffee may be dispensed from the beverage receptacle 26 through conventional discharge means 28. As noted above, the beverage concentrate flow rate is substantially the same as the first or container flow rate and comprises the product achieved by the mixing of the liquid reactive food products, such as the coffee 24 in the container 22, with the liquid provided by the pump means 14 through the flow control valve 18 and check valve 20. It will be appreciated that there is a very slight difference between the container flow rate and beverage concentrate flow rate due to, for example, the absorption and retention of a small amount of water by the coffee. However, for all practical purposes, the two flow rates may be considered equal.

In order to provide a consistently high quality and delectable taste in the coffee, applicant has found it necessary to control the container flow of hot water in response to the pressure existing in the container 22. That is, applicant has found that to provide a given amount of coffee in the beverage receptacle 26 in a fixed time period, the container flow of hot water is decreased and, consequently, the bypass flow is increased as the pressure in the container 22 increases. Thus, in a given time period, as determined by the timer 16, there is provided a constant amount of coffee comprising the sum of the bypass flow hot water and the beverage concentrate flow from the container 22. Even though these two flow rates may vary, their sum is always constant. For example, where the container 22 is a conventional one-pound can of freshly roasted ground coffee, applicant has found that there can be provided two and one-half to four gallons of coffee in the beverage receptacle 26 in a five minute cycle of operation of the improved beverage maker arrangement 10. However, depending upon the pressure contained in the container 22, the relative amounts of flow in the container flow and the bypass flow may vary. Applicant's improved flow control valve 18 achieves this variation by automatically adjusting the bypass flow and the container flow rates dependent upon the pressure contained in container 22.

FIGURE 2 illustrates the relative proportions achieved by the flow control valve. As shown on FIGURE 2, the beverage concentrate flow rate, which is the same as the container flow rate, decreases as the pressure within the container 22 increases. Similarly, the bypass flow rate decreases as the pressure decreases and increases with increasing pressure. However, at any given pressure the sum of the beverage concentrate flow and bypass flow rate is constant and is equal to the second or pump discharge flow rate from the pump 14.

For example, in the pressure range of approximately 15 to 35 p.s.i., applicant has found that the liquid should be in contact with the coffee for five minutes for good brewing efficiency. If it is desired to make four gallons of coffee from the one-pound of coffee contained within the container 22, the pump discharge flow rate should be 0.8 gallon per minute to provide the four gallons of coffee in five minutes. Applicant has selected this figure for illustration since four gallons of coffee may often be selected as the amount to be dispensed from a single one-pound container of freshly ground coffee on, for example, a conventional mobile catering vehicle. For such a coffee making rate, applicant has found that the container flow rate is approximately 0.8 gallons per minute for a pressure in the container 22 of about 19 p.s.i., 0.4 gallon per minute for a pressure of about 24 p.s.i., and 0.2 gallon per minute for a pressure of about 32 p.s.i. The corresponding bypass flow rates are, of course, zero gallons per minute at about 19 p.s.i., 0.4 gallon per minute at about 24 p.s.i. and 0.6 gallon per minute at about 32 p.s.i.

It will be appreciated that similar flow values for materials other than coffee and for durations other than five minutes may be readily determined after the operator of the improved beverage maker 10 has determined what is considered to be a quality and tasteful beverage.

FIGURE 3 illustrates the structure associated with one embodiment of applicant's invention as it may be utilized in sanitarily providing an improved quality of hot coffee. The structure shown on FIGURE 3 corresponds to the schematic diagram of FIGURE 1. As shown on FIGURE 3, there is provided a pair of inlet valves 30 and 32 that are adapted to receive filtered hot water, indicated by the arrows 34 from either one or two separate sources of hot water in liquid reservoirs flowing through filters 13. The hot water flows from the inlet valves 30 and/or 32 to the pump 14 which, for example, may be electrically operated. The structure as shown on FIGURE 3 is particularly adaptable to utilization in a mobile catering vehicle since there is generally provided, in such a mobile catering vehicle, one or more coffee dispensing arrangements similar to that llustrated on FIGURE 4.

As shown on FIGURE 4, the liquid reservoir 12 comprises a jacket around the beverage receptacle 26. Hot water is maintained in the space intermediate the liquid reservoir 12 and the beverage receptacle 26. The hot water may be drawn off from the liquid reservoir 12 and supplied to the inlet valve 30. A similar hot coffee container may be provided to supply hot water to inlet valve 32, and if more than two beverage receptacles are provided they may also be similarly connected.

The hot water from the liquid reservoir 12 is supplied to the pump 14 which is controlled by timer means 16. Thus, timer means 16 may be set for any predetermined length of time and allows operation of the pump means 14 to draw hot water from the liquid reservoir 12 during such predetermined time and terminates operation of the pump means 14 after the predetermined time has elapsed.

The second flow rate, which may be called the pump discharge flow rate, flows from the pump 14 into the flow control valve 18. The flow control valve 18 has an inlet port 36 for receiving the pump discharge flow rate, a container outlet port 38 for allowing flow therethrough of the first or container flow rate of hot water and a bypass port 40 for allowing the flow of a bypass flow rate from the flow control valve 18. The relative amounts of hot water contained in the container flow rate and the bypass flow rate is determined by the pressure in the container 22 and is automatically provided by applicant's improved flow control valve 18.

In order to achieve this desired predetermined flow pressure relationship applicant provides a plunger means 42 threadingly engaging internal portions of the body member 44 of the flow control valve 18. A spring means 46 is mounted on the internal end of the plunger means 42 and a seat means 48 slidingly engages a pronged portion 50 of the plunger means 42.

When there is insufficient pressure in the pump discharge flow to the flow control valve 18, the spring means 46 yieldingly urges the seat means 48 into sealing engagement with internal wall portions 52 of the body member 44 of the flow control valve 18. When inlet flow commences at a predetermined pressure in the valve 18, force on the inside surface 54 of the seat means 48 moves the seat means 48 towards the plunger 42 to break the seal between the wall portions 52 and the seat means 48. As the pressure on the face 54 increases, movement of the seat 48 away from the wall portions 52 becomes greater and hence the bypass flow rate becomes greater. Therefore, as the pressure increases, the bypass flow rate through the bypass port 40 and out the bypass tube 41 increases, and the container flow rate through the container port 38 decreases; however, the sum of these two flow rates is always constant and equal to the pump discharge flow rate.

In the preferred embodiment of applicant's invention the seat 48 is fabricated from a material such as Teflon, nylon, or the like, to provide the proper operation as described above. A sliding seal, such as O-ring 56, is provided between the plunger member 42 and the body member 44 of the flow control valve 18 to prevent leakage flow past the plunger member 42. It will be appreciated that the threading engagement of plunger 42 with body member 44 allows adjustment of the container flow-container pressure relationship. Thus, movement of plunger 42 towards the seat means 48 increases the force on spring 46 and increases the cracking pressure, that is, the pressure at which bypass flow first commences, of the flow control valve 18 and movement of the plunger member 42 away from seat means 48 decreases the cracking pressure thereof.

The container flow rate of hot water leaves the container discharge port 38 of the flow control valve 18 and enters a unidirectional flow valve such as check valve 20. In the preferred body of applicant's invention, the check valve 20 comprises a flexible, generally conically shaped, thin wall, body member 58 having inside wall portions 60 defining a liquid receiving cavity 62 that is adapted to receive the container flow rate from the flow control valve 18. The body member 58 is provided with a slit 64 therethrough at the apex thereof to allow the flow of fluids from the fluid receiving cavity 62 through slit 64; however, in the event that the fluid pressure on the external surfaces 66 of the body member 58 becomes greater than the pressure in the fluid receiving cavity 62, then the slit 64 closes to prevent any back flow of fluid through the check valve 20 and back into the liquid reservoir 12.

The container fluid flow rate of hot water flows from the check valve 20 into a passageway 68 defined by a fixed mounting block 70 and a supply support 72. A plurality of supply means piercing members 74 are coupled to the supply support 72 and, for example, four such supply piercing members 74 may be provided in a pattern defining a square. Each of the supply piercing members 74 has internal walls 76 defining a fluid flow passage therethrough and a plurality of discharge orifices 78 to allow the flow of fluid therefrom. FIGURE 5 illustrates the preferred supply piercing member 74 in greater detail than shown on FIGURE 3. As shown on FIGURE 5, the supply piercing member 74 comprises a substantially cylindrical body portion 80 through which is provided the flow passage 76. The outer end 82 of the supply piercing member 74 is generally pyramidical in shape to provide a point 84 defined by a plurality of faces 86. The discharge orifices 78 are provided in each of the faces 86 and, in the preferred embodiment of the applicant's invention, are adapted to discharge fluid at substantially right angles to the direction of flow in the passageway 76.

Resilient sealing members 88 are provided around each of the supply piercing member 74 and abut against the supply support 72.

A bracket means 90 is slidingly mounted on a pair of spaced apart shafts 92 for reciprocating motion thereon in the direction indicated by the arrow 94. Movement of the bracket 90 is controlled by threaded shaft 96 that threadingly engages the bracket 90 and has a first end rotatably supported in bearing-supports 98 and 100, and a freely rotating, unsupported second end. Rotation of the handle means 102 in the directions indicated by the arrow 104 moves the bracket 90 in the direction indicated by the arrow 94. The support of the bracket 90 is more clearly shown on FIGURE 6. The shafts 92 are mounted in the block 101 and in the member 70.

An extraction support 106 is coupled to the bracket 90 to define an extraction passageway 108 therebetween for allowing the flow therethrough of beverage concentrate to a beverage concentrate discharge tube 110.

A plurality of extraction piercing members 112 are coupled to the extraction support 106 and the extraction piercing members 112 are identical to the supply piercing member 74 discussed above and illustrated on FIGURE 5 in greater detail. Similarly, resilient sealing members 114 are provided around each of the extraction piercing members 112 and abut against the extraction support 108.

In the preferred embodiment of applicant's invention, the extraction piercing members 112 are arranged in the form of a square of substantially the same dimensions as the square defined by the supply piercing members 74; however, the extraction piercing members 112 are rotated 45 degrees from alignment with the supply piercing members 74. Applicant has found that such an arrangement of the supply piercing members 74 and extraction piercing members 112 provides good flow characteristics. The extraction piercing members 112 have internal flow passages that allow the flow of beverage concentrate therethrough to the passageway 108 for delivery to the beverage concentrate supply tube 110.

Gasket means, such as O-rings 116 and 118 are provided, respectively, on the supply support 72 and extraction support 106 to seal, respectively, the supply passageway 68 and the extraction passageway 108.

In operation, when it is desired to make, for example, a supply of hot coffee, a supply of hot water is connected to either or both of valves 30 and 32 from liquid reservoirs 12. Bypass tube 41 and beverage concentrate tube 110 are connected to the cover of the beverage receptacle 26, as shown in FIGURE 4, for proper mixing therein to provide a supply of hot coffee. A sealed container 22 which, for example, may be a sealed one-pound can containing freshly ground coffee 120 is placed adjacent to the supply piercing members 74 and the extraction piercing members 112. The handle 102 is then rotated to move the extraction piercing members towards the supply piercing members 74. Such movement allows both the supply piercing members 74 and the extraction piercing members 112 to penetrate the container 22 and extend therein a preselected distance. Rotation of the handle 102 continues until the sealing members 88 and 114 sealingly engaged the ends 122 and 124, respectively, of the container 22.

The distance that both the supply piercing member 74 and extraction piercing members 112 extend into the container 22 that is the actual length of both the supply and extraction piercing members is determined by, for example, the contents of the container 22 that is, the type of liquid reactive food product contained therein. The timer 16 may then be set for a predetermined time interval and this activates the pump 14 to supply a second or pump discharge flow rate to the flow control valve 18.

As noted above, the pump discharge flow rate is divided into the container flow rate that flows through the supply piercing member 74 and the bypass flow rate that flows out the bypass tube 41. As the container flow sprays from the supply piercing member 74 into the interior of the container 22, it sets the contents thereof and reaction takes place therebetween. When the liquid reactive product 120 is coffee, applicant has found that the smaller grounds are carried with the flow of container flow towards the extraction piercing members and in this transition all of the contents of the container 22 are subjected to exposure to the container flow and react therewith to provide the beverage concentrate. The smaller particles within the container 22 tend to abut against the inside of the end 124 of the container 22 and act as a filtering buffer for the comparatively clear beverage concentrate that flows out of the extraction piercing members 112 through the beverage concentrate tube 110 to the beverage receptacle 26 where it is mixed with the appropriate bypass flow.

In the event that the pressure in the container 22 should rise above that to be supplied by the pump 14, the slit 64 in the body member 58 of check valve 20 closes due to the greater pressure on the external surfaces 66 thereof and thus no back flow of coffee concentrate or liquid reactive food product is carried back to the pump 14 and liquid reservoir 12 or through the bypass tube 41. In this event the bypass tube 41 would handle the entire pump discharge flow and thereby acts as a pressure relief for the pump.

This concludes the description of a preferred embodiment of applicant's invention. From the above, it can be seen that applicant has provided an improved arrangement for providing a consistent quality of beverage from a liquid reactive food product. Those skilled in the art may find many variations and adaptations of applicant's invention and the following claims are intended to cover all such variations and adaptations falling within the true scope and spirit of applicant's invention.

What is claimed as new and desired to be secured by Letters Patent of the United States is:

1. In a beverage dispensing arrangement of the type in which a liquid is injected into a container of liquid reactive product, and a beverage concentrate is removed therefrom, the improvement comprising, in combination:
   at least one liquid storage reservoir;
   supply means for supplying a liquid from at least one liquid storage reservoir into the container of liquid reactive products at a first preselected pressure and at a first predetermined flow rate;
   flow control means for varying said first predetermined flow rate into said container in response to the pressure in the container;
   unidirectional flow means for allowing flow from said liquid storage reservoir into the container and for preventing liquid flow from the container into said liquid storage reservoir; and
   extraction means for extracting beverage concentrate from the container.

2. The arrangement defined in claim 1, wherein said unidirectional flow means comprises a flexible, generally conically shaped, thin wall body member having inside surfaces defining a liquid receiving cavity, and having a slit in the apex thereof for allowing liquid to flow from said cavity into the container, and said slit adapted to sealingly close upon subjection to a fluid pressure on the outside surfaces of said body member greater than the fluid pressure on said inside surfaces thereof to prevent liquid flow from the container into said liquid storage reservoir.

3. The arrangement defined in claim 1, wherein said flow control means comprises a body member having an inlet port for receiving the liquid at a second flow rate greater than said first flow rate, a bypass outlet and a container outlet for transmitting a first part of said second flow rate comprising said first predetermined flow rate to the container, and said bypass outlet for bypassing a second part of said second flow rate to provide a bypass flow rate; and
   a resiliently mounted slide means slidingly mounted in said body member and positioned between said inlet port and said bypass outlet port for reciprocating motion therein to vary said bypass flow rate in response to said pressure in the container.

4. The arrangement defined in claim 3, wherein said liquid reactive product is coffee, said liquid is heated water and said first preselected pressure is in the range of 35 to 15 p.s.i. and said first liquid flow rate is in the range, correspondingly, of approximately ⅕ to ⅘ of a gallon per minute, the container contains approximately one pound of freshly ground coffee, and the duration of liquid flow through the container is approximately five minutes.

5. The arrangement defined in claim 3 and further comprising means for mixing said beverage concentrate flow from the container and said bypass flow from said flow control means in predetermined proportions to provide a potable beverage.

6. The arrangement defined in claim 1, wherein said unidirectional flow means comprises a flexible, generally conically shaped, thin wall body member having inside surfaces defining a liquid receiving cavity, and having a slit in the apex thereof to allow liquid to flow from said cavity into the container, and said slit adapted to sealingly close upon subjection to a fluid pressure on the outside surfaces of said body member greater than the fluid pressure on said inside surfaces thereof to prevent liquid flow from the container into said liquid storage reservoir; and
said flow control means comprises a body member having an inlet port for receiving a liquid from said liquid storage reservoir at a second flow rate greater than said first flow rate, a bypass outlet port and a container outlet port, and said container outlet port for transmitting said first predetermined liquid flow rate to said cavity defined by said inside surfaces of said body member of said unidirectional flow means for transmission to the container, and said bypass outlet port for bypassing a part of said second flow rate to provide a bypass flow rate, and a slide means resiliently mounted in said body member intermediate said inlet port and said bypass outlet port for reciprocating motion therein to vary said bypass flow in response to the pressure in the container.

7. The arrangement defined in claim 6, wherein said supply means for supplying a liquid from said liquid storage reservoir into the container and said extraction means for extracting beverage concentrate from the container each comprise four hollow tubular piercing members having fluid flow passages therein adapted to pass liquid therethrough and having a substantially equilateral pyramidical piercing end for piercing the container, and each face of said piercing end having a flow orifice for allowing the passage of liquid between regions external of the piercing member and said flow passages therein, and said four piercing members of said supply means positioned at the apexes of a square, and said four piercing members of said extraction means positioned at the apexes of a square and rotated 45 degrees from alignment with said four piercing members of said supply means; and
sealing means on each of said piercing members for fluid sealing engagement with outside surfaces of the container.

8. The arrangement defined in claim 7, wherein said piercing members of said supply means are positioned in a first end of the container and said piercing members of said extraction means are positioned in a second end of the container spaced apart from said first end.

9. The arrangement defined in claim 8, wherein said supply means further comprises a pump means having an inlet port for receiving liquid from said liquid storage reservoir and a discharge port for discharging the liquid at said first preselected pressure and said second flow rate, and timer means for controlling the duration of flow of liquid at said second flow rate from said pump.

10. The arrangement defined in claim 8, wherein said liquid reservoir comprises a liquid heating water jacket surrounding a beverage receptacle, and said bypass flow rate and said beverage concentrate flow rate are provided into said beverage receptacle.

References Cited
UNITED STATES PATENTS

| 2,899,106 | 8/1959 | Reinert | 99—295 |
| 2,935,011 | 5/1960 | Perlman | 99—289 |
| 2,939,381 | 6/1960 | McBride | 99—289 |
| 2,952,202 | 9/1960 | Renner et al. | 99—295 X |

ROBERT W. JENKINS, *Primary Examiner.*